United States Patent [19]

Herrema et al.

[11] Patent Number: 5,020,272

[45] Date of Patent: Jun. 4, 1991

[54] LANDSCAPE EDGING SYSTEM

[76] Inventors: Robert T. Herrema, 5096 Waterside Dr.; Steven C. Windemuller, 350 - 24th Ave., both of Hudsonville, Mich. 49426

[21] Appl. No.: 457,929

[22] Filed: Dec. 27, 1989

[51] Int. Cl.$^5$ .............................................. A01G 1/00
[52] U.S. Cl. ............................................ 47/33; 52/102
[58] Field of Search .......................... 52/102, 364, 365; 47/33

[56] References Cited

U.S. PATENT DOCUMENTS

| | | |
|---|---|---|
| D. 250,774 | 1/1979 | Martinelli . |
| D. 257,064 | 9/1980 | Kobee . |
| 425,890 | 4/1890 | Landis . |
| 557,030 | 3/1896 | Schaefer ............................... 47/33 X |
| 1,843,108 | 2/1935 | Clayden . |
| 2,094,519 | 9/1937 | Ballard . |
| 2,721,633 | 10/1955 | Keelor . |
| 2,769,277 | 11/1956 | Keelor . |
| 2,809,809 | 10/1957 | Johnston . |
| 2,821,809 | 2/1958 | Collier et al. . |
| 2,842,344 | 7/1958 | Todd . |
| 3,332,197 | 7/1967 | Hinkle ............................... 47/33 X |
| 3,373,668 | 3/1968 | Moore et al. . |
| 3,387,786 | 6/1968 | Rynberk . |
| 3,472,133 | 10/1969 | Ziehm, Jr. . |
| 3,484,989 | 12/1969 | Lazinsky . |
| 3,525,373 | 6/1970 | Abbe . |
| 3,724,128 | 4/1973 | Tabone . |
| 3,788,001 | 1/1974 | Balfanz, Jr. . |
| 3,841,022 | 10/1974 | Thodos . |
| 3,933,311 | 1/1976 | Lemelson . |
| 4,281,473 | 8/1981 | Emalfarb et al. . |
| 4,516,875 | 5/1985 | Turner ............................... 52/365 X |
| 4,628,632 | 12/1986 | Zwier . |
| 4,644,685 | 2/1987 | Tisbo et al. . |
| 4,647,491 | 3/1987 | Ireland et al. . |
| 4,702,034 | 10/1987 | Ferguson et al. . |
| 4,747,231 | 5/1988 | LeMay et al. . |
| 4,823,521 | 4/1989 | Kontz, Jr. . |

FOREIGN PATENT DOCUMENTS 3717877 8/1988 Fed. Rep. of Germany .
399250 10/1933 United Kingdom .

OTHER PUBLICATIONS

Morrison Steel Company advertisement in "American Nurseryman", Jul. 15, 1958.
Oly-Ola Sales, Inc., brochure regarding Edg-King and Edg-Queen.

Primary Examiner—David A. Scherbel
Assistant Examiner—Linda J. Watson
Attorney, Agent, or Firm—Price, Heneveld, Cooper, DeWitt & Litton

[57] ABSTRACT

An area edging system comprising a self-coupling edging strip two ends of which can be slidably connected together on either sides of each other. Also provided is a novel support stake that can be snap fastened to an edging strip and securely fastened thereto and securely held in the ground. Also provided are modular coupling members for forming sharp radius curves, sharp angle corners and mid-span coupling.

22 Claims, 2 Drawing Sheets

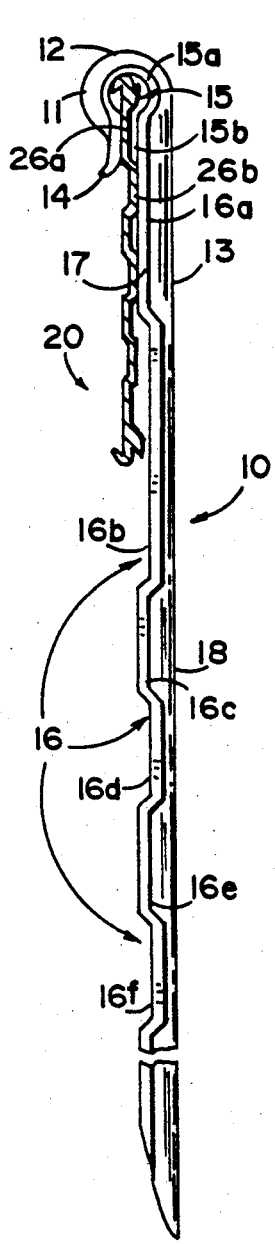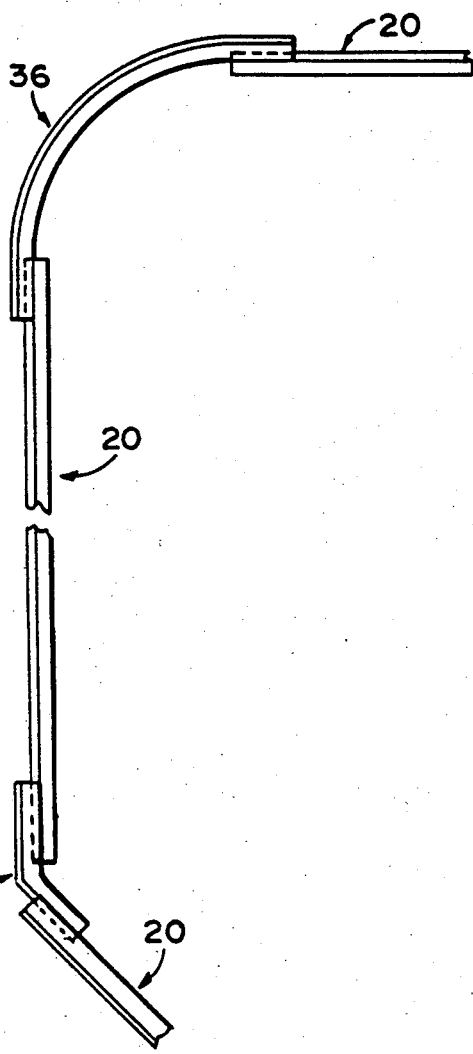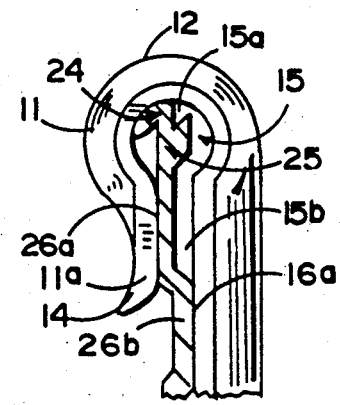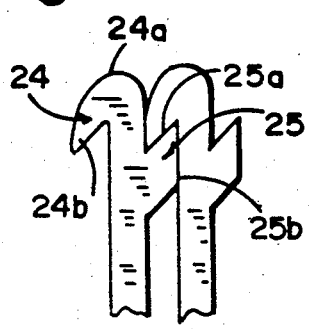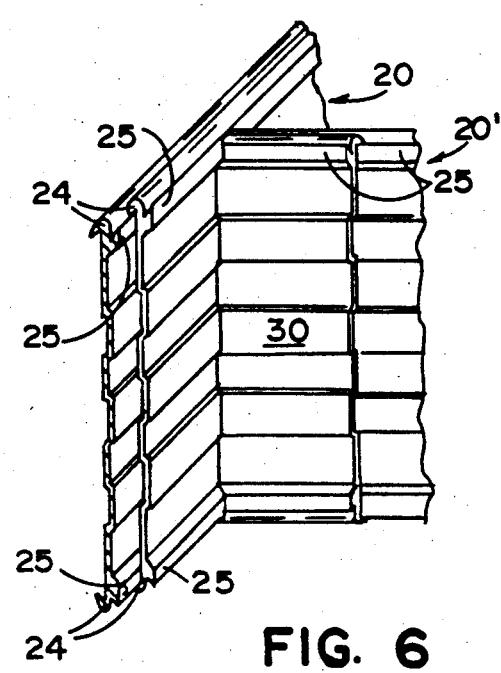

LANDSCAPE EDGING SYSTEM

BACKGROUND OF THE INVENTION

The present invention relates to devices for defining a border between one area and an adjacent area which are useful in landscaping and has other useful purposes.

Typical edging systems generally comprise a plurality of edging strips which are connected together or one strip which is curved in a geometrical shape (such as a circle) which requires the ends of the strip to be connected together. Many different shapes of edging strips have been conceived for connecting the ends of strips together, many of them requiring a separate connector coupling or a specific relationship of the edging ends to the stakes which hold the edging in the ground. To our knowledge, none of these edging strips have been satisfactory particularly because of the requirements of providing a separate connecting means for connecting two ends together in the installation of the edging strips in the ground.

Such requirement is particularly evident when using one strip curved so that the two ends thereof are to be connected together. To avoid the use of a separate connector, some edges provide specially-prepared ends of different configuration which permit the ends to be spliced to one another. However, such designs require predetermined special lengths for different shapes and sizes of installations since they preclude cutting the edging strips at any desired length at the location of the installation.

Further, edging systems typically "sink" into or "float" out of the ground as it heaves and shifts, with changes in the weather. Also, prior art stakes used to hold the strips in the ground are usually difficult to install and, once installed, they are difficult to separate from the edging.

SUMMARY OF THE INVENTION

The edging system of the present invention uses an edging strip which has longitudinal corrugations to resist "floating" or "sinking." The present edging strip also has two distinct sides, so-called male and female sides. This difference in sides allows two ends of edging to be self-splicing by merely engaging the male side of one end with the female side of another end. These ends are not specially prepared and a strip of edging can be cut in mid-span to fit a particular application without defeating the self-splicing function and without requiring any different orientation of the ends. Further, a sufficiently long strip of this differentially-sided edging can encompass a closed area and still self-splice the two ends together.

This edging system includes securing stakes which also present a corrugated profile to "grab" the earth and preclude "floating" or "sinking." The top portion of a stake is bent over forming a long leg and a short leg and defining a keyhole-like slot. The end of the short leg is flared away from the long leg to facilitate insertion of the edging into the slot. The system is not biased in this regard, that is, one edge of the edging is accommodated as easily as the other, thus the edging does not need to be positioned in the ground with a particular orientation. The flare of the short leg of the stake helps to expand the slot as the edging is snapped into the keyhole slot. Also, this flare facilitates the prying of the short leg with a hammer claw or the like if the stake is to be removed from the edging strip.

The edging system of the present invention also includes versatile modular coupling members which can be used to enhance architectural designs where sharp corners and small radius curves are desired. A sharp corner coupler can be placed in mid-span to couple two pieces of edging in a generally T-configuration or the same coupler can couple two ends of edging to form a corner. Further, a short piece of the edging itself can be used mid-span to couple two strips of edging at a tangent point between two arcs.

These and other objects, features and advantages of the invention will be more clearly understood and appreciated by reference to the written specification and appended drawings.

BRIEF DESCRIPTION OF THE DRAWINGS

FIG. 5 is a cross-sectional view taken through a piece of edging disclosure an elevational view of a stake snapped over the edging;

FIG. 6 is an elevational perspective view of a sharp corner coupler coupling two pieces of edging in a generally T-configuration;

FIG. 7 is a plan view of two coupling members connecting pieces of edging together and illustrating different methods of coupling with alternative coupling members;

FIG. 8 is an enlarged partial, side elevational view of that of the system encircled in FIG. 5; and FIG. 9 is an enlarged partial, side elevational view of the top edge of the edging strip, the bottom edge being identical.

DESCRIPTION OF THE PREFERRED EMBODIMENT

Figure 1:
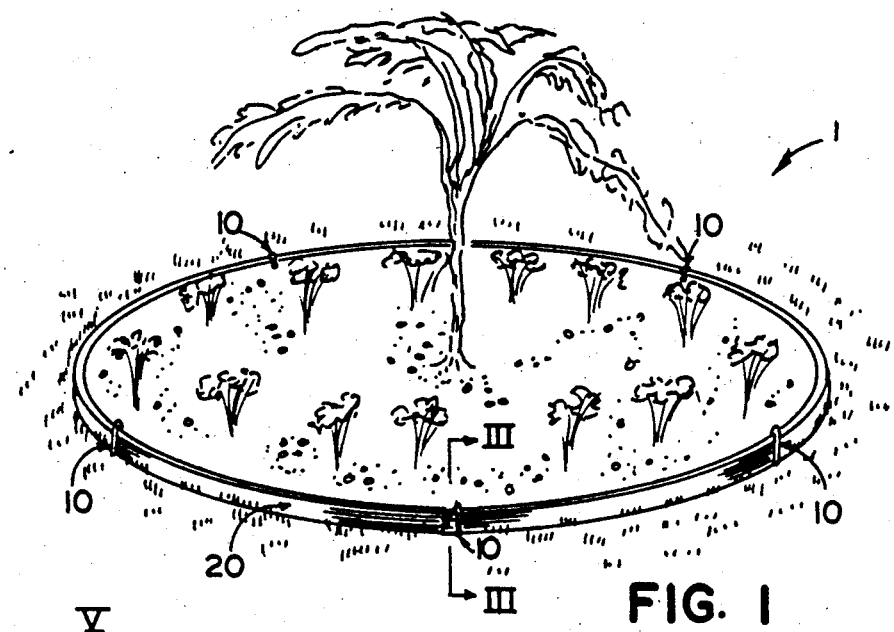
FIG. 1 shows a perspective of a single length of edging with its ends self-spliced to define a closed area around a tree.

Referring generally to FIGS. 1, 2, 5 and 6, the edging system 1 of the preferred embodiment comprises edging strip 20 and securing stakes 10.

Each securing stake 10 has a top portion or head 12 which is bent over to form a short leg or lip 11, a long leg 13 and a cavity or slot 15 (FIG. 5). Stake 10 is generally of a flat bar configuration having multiple recesses 16 to enhance its gripping ability and having a rib 18 for stiffening. Slot 15 presents a keyhole configuration with an upper cylindrical capture portion 15a and a lower slot channel portion 15b which is narrower than the diameter of cylindrical portion 15. Leg 11 has sufficient resilience so as to flex when the leg is forced over the top edge of an edging strip such as edging strip 20 and has sufficient memory to prevent the edging strip from coming out of slot 15 except by forcing the lip open with an instrument such as the claw of a hammer. Short leg 11 includes a flared end or lip 14 which enhances the insertion and removal of edging strip 20.

The recesses 16 of stake 10 include two longer recesses 16a and 16b and shorter recesses 16c, 16d, 16e and 16f. Recess 16a provides a bearing surface 17 which spans three recesses (FIG. 5) of the edging strip 20 and recess 16b provides clearance for the enlarged bottom edge of the edging strip 20. Thus, the edging strip 20 is held flush and parallel to the stake 10.

Edging strip 20 is a thin strip of extruded aluminum in the preferred embodiment with longitudinal grooves 26 and ridges 28 giving a corrugated appearance. Edging strip 20 has a female side 21 and a male side 22. Female side 21 has longitudinal hook-shaped ridges 24 near each top and bottom edge, not found on male side 22. Ridge 24 includes the rounded knob like top surface 24a provided to facilitate insertion into the slot 15b. Surface 24a is tapered and terminates at the inclined surface 24b providing a recess for receiving the flange 25 on the male side 22.

Located on the male side 22 is a flange 25 having an inclined surface 25a forming a longitudinal edge groove 25b on each edge of edging strip 20. An arcuate and inclined surface 25c is provided opposite surface 25a for facilitating the removal of stake 10, it being understood flange 25 extending a distance from the face of strip 20 holds the strip within cavity 15 unless a force is applied to lip 11 as above described Grooves 26, ridges 28, hook shaped ridges 24 and flanges 25 extend the entire length of the edging strip 20.

Figure 2:
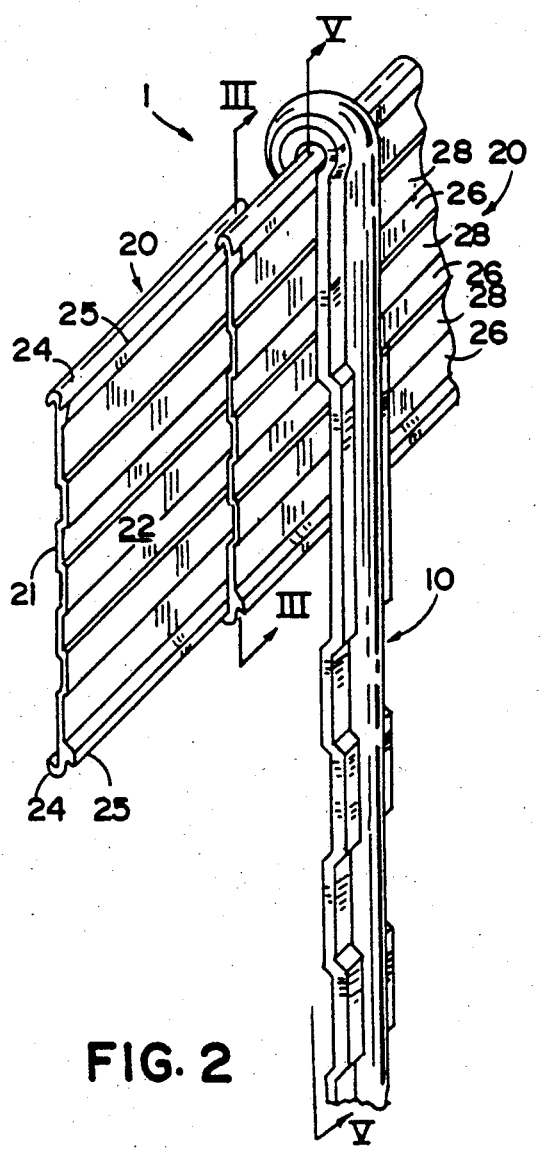
FIG. 2 shows a perspective of two ends of edging joined together with a securing stake snapped onto one piece of edging.
Figures 3, 4:
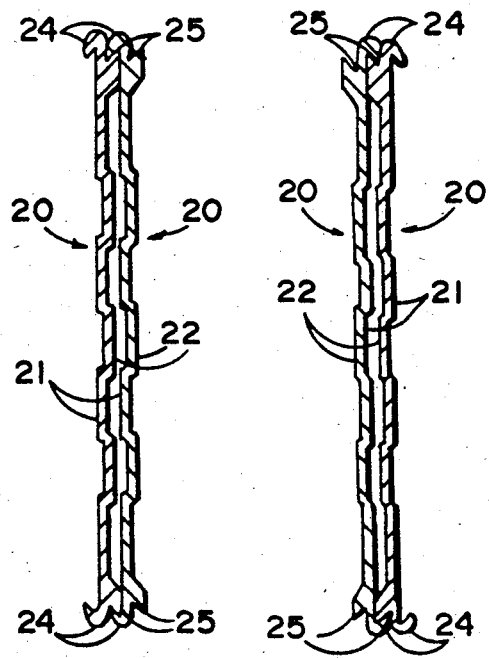
FIG. 3 is an elevational, cross-sectional view taken along the plane III—III of FIG. 1 through two coupled pieces of edging.
FIG. 4 is a cross-sectional view similar to FIG. 3 but with the edging ends engaging each other on opposite sides to demonstrate that there is no designated top and bottom or front and back to the edging.

The ends of edging strip 20 are self-splicing by simply engaging the flange 25 of the male side of one end of edging strip 20 with the hook shaped ridge 28 of the female side of another end of edging strip 20 (FIG. 2). As seen in FIGS. 3 and 4, hooks 24 on female side 21, at each edge of edging strip 20, engage flanges 25 at each edge of edging strip 20. When so engaged, surfaces 24b and 25a engage each other (FIG. 9). Further, because the transverse cross section of edging strip 20 is vertically symmetrical, there is not a designated top edge and bottom edge per se and a specific orientation is not required other than the edging strip be vertical (see FIGS. 3 and 4). Because edging strip 20 includes a female side 21 and male side 22 and has vertical symmetry, either sides of the ends of two sections of edging strip 20 can engage each other for connecting the two sections together. Therefore, it is possible to border a closed area with a single piece of edging strip 20 of sufficient length (FIG. 1).

Stakes 10 are fastened to edging strip 20 by sliding an edge of edging strip 20 between short leg 11 and long leg 13. The flare of lip 14 and the rounded surface 24a facilitates this process by offering a sufficiently wide opening or channel portion 15b for an edge of edging strip 20 to enter slot 15 and thereby spread short leg 11 and long leg 13 apart as edging strip 20 slides into slot 15 and is captured by capture portion 15a. Stakes 10 can also be forced down alongside edging strip 20, already positioned, such that the upper edge of edging strip 20 engages slot 15 as stake 10 is forced down. Once in place, the longitudinal corrugation of edging strip 20 and recesses 16 of each stake 10 "grip" the earth to maintain the position of edging system 1 relative to the earth, minimizing the possibility for "floating" or "sinking."

As disclosed in FIG. 5, when the stake is in place holding the edging strip 20 in the ground, the lip 11 bears against the surface 26a of the strip immediately below the enlarged edge formed by hook 24 and flange 25 which is captured by the slot portion 15a. Surface 17 of stake 10 bears against the two surfaces 26b and 26c formed immediately below surface 26a. The lower enlarged edge extends a short distance into the recess 16b. With this arrangement, the edging strip is flush and parallel to stake 10.

If a stake 10 is to be removed from edging strip 20, this procedure is also facilitated by the flare of lip 14 which offers a lip under which one can pry short leg 11 away from long leg 13, widening slot 15 to ease the removal of edging strip 20 therefrom.

FIGS. 6 and 7 disclose various types of couplers for coupling pieces of strips 20 together. A right angle coupler 30 is shown in FIG. 6 essentially comprising two short sections of edging strip 20 fastened together whereby coupler 30 has the same transverse section as edging strip 20, having a male side 22 and a female side 21. As seen in FIG. 7, various alternative coupling members, each having the same transverse section as edging strip 20, can be used, such as small radius coupler 36 or wide angle coupler 34, to create architectural interest.

As mentioned above, various couplers 30, 34 and 36 can be used for sharp angle and small radius corners. As shown in FIG. 6, a right angle coupler 30, for example, is placed mid-span along a piece of edging 21 and coupled with an end of a piece of edging strip 20' to form a "T." Alternatively, coupler 30 can be used at an end of edging strip 20 and coupled with an end of edging strip 20 to form a corner. Because the sectional profile of each coupler is the same as the sectional profile of edging strip 20, edging strip 20 can couple with either side of each coupler as shown in FIG. 7 regarding coupler 34, just as an end of edging strip 20 can be coupled on either side of another end of edging strip 20. Further, any coupler can be coupled with another coupler (not shown) as might be desired and a short length of edging strip 20 can also be applied as a coupler for specific applications.

The above description is considered that of preferred embodiments only. Modifications of the invention will occur to those who make or use the invention. Therefore, it is understood that the embodiment shown in the drawings and described above is merely for illustrative purposes and is not intended to limit the scope of the invention, which is defined by the following claims.

The embodiments of the invention in which an exclusive property or privilege is claimed are defined as follows:

1. An area edging system, useful in landscaping and having other useful purposes, comprising:
    an elongated edging strip having a length and two ends;
    said edging strip throughout its length having a first side including a first and second means extending along said first side and spaced laterally from each other and configured to provide a male portion and a second side including a third and fourth means extending along said second side and spaced laterally from each other and configured to provide a female portion, said configurations of said sides being such that said male portion is receivable in said female portion whereby the two ends of a single piece of said edging can be coupled together by engaging said male portion of said first side with said female portion of said second side without introducing a twist into the length of said edging strip;

a plurality of securing stakes used in cooperation with said edging strip to secure said edging strip;

said stakes having a top portion which is bent over, forming a long leg and a short leg and defining a slot, such that said stakes can be snapped onto said edging strip by sliding said top edge of said edging into said slot of said top portion.

2. The edging system of claim 1 wherein said edging strip includes top and bottom edges and a longitudinal flange at each of the top and bottom edges on said first side and a longitudinal ridge near each said top and bottom edges on said second side; each said ridge projecting from said second side and forming a hook-shaped ridge with a longitudinal groove, said hook-shaped ridges cooperating with said flanges whereby two ends of said edging strip can be coupled together by engaging said hook-shaped ridges over said flanges.

3. The edging system of claim 1 wherein said long leg of said stakes comprises a flat bar having transverse ridges and grooves and having a longitudinal rib.

4. The edging system of claim 1 wherein said short leg of said stakes includes an end which is flared away from said long leg to facilitate the insertion of said edging between said long leg and said short leg and to facilitate prying said short leg away from said long leg to facilitate the removal of said edging from between said long leg and said short leg.

5. The edging system of claim 1 wherein said slot at said top portion of said stakes is keyhole-shaped formed by an upper capture portion and a lower slot channel portion, such that a top edge of a piece of said edging, inserted between said short leg and said long leg of said stakes forcibly slides through said channel portion and come to rest in said capture portion of said keyhole slot whereby said top edge is captured by said keyhole slot and said stake is fastened to said edging.

6. The edging system of claim 1 having coupling means for coupling at least two pieces of said edging strip, said coupling means having first and second sides of the same configurations as said two pieces of said edging strips so as to interfit with said first and second sides of said pieces of said edging strips, respectively.

7. The edging system of claim 6 wherein said coupling means includes a coupling device having two portions formed at an angle to each other whereby two pieces of said edging strip can be coupled to form an angle between them.

8. The edging system of claim 6 wherein said coupling means includes a coupling device having an arc of small radius in plan view whereby at least two pieces of said edging strip can be coupled.

9. The edging system of claim 2 having coupling means for coupling at least two pieces of said edging strip, said coupling means having first and second sides of the same configurations as said two pieces of said edging strips so as to interfit with said first and second sides of said pieces of said edging strips, respectively.

10. The edging system of claim 9 wherein said coupling means includes a coupling device having two portions formed at an angle to each other whereby two pieces of said edging strip can be coupled to form an angle between them.

11. The edging system of claim 9 wherein said coupling means includes a coupling device having an arc of small radius in plan view whereby at least two pieces of said edging strip can be coupled.

12. The edging strip of claim 1 in which the male and female portions of said strip in vertical cross section are symmetrical about the longitudinal center line of said strip.

13. An area edging system, useful in landscaping and other purposes, comprising:

an elongated edging strip having a length and two ends;

said edging strip throughout its length having a first side including a first and second means extending along said first side and spaced laterally from each other and configured to provide a male portion and a second side including a third and fourth means extending said second side and spaced laterally from each other and configured to provide a female portion, said configurations of said sides being such that said male portion is receivable in said female portion whereby the two ends of a single piece of said edging can be coupled together by engaging said male portion of said first side with said female portion of said second side without introducing a twist into the length said edging strip.

14. The edging strip of claim 13 in which the male and female portions of said strip in vertical cross section are symmetrical about the longitudinal center line of said strip.

15. The edging system of claim 13 wherein said edging strip includes top and bottom edges and a longitudinal flange at each of the top and bottom edges on said first side and a longitudinal ridge near each said top and bottom edges on said second side; each said ridge projecting from said second side and forming a hook-shaped ridge with a longitudinal groove, said hook-shaped ridges cooperating with said flanges whereby two ends of said edging strip can be coupled together by engaging said hook-shaped ridges over said flanges.

16. The edging system of claim 13 having coupling means for coupling at least two pieces of said edging strip, said coupling means having first and second sides of the same configurations as said two pieces of said edging strips so as to interfit with said first and second sides of said pieces of said edging strips, respectively.

17. The edging system of claim 16 wherein said coupling means includes a coupling device having two portions formed at an angle to each other whereby two pieces of said edging strip can be coupled to form an angle between them.

18. The edging system of claim 16 wherein said coupling means includes a coupling device having an arc of small radius in plan view whereby at least two pieces of said edging strip can be coupled.

19. The edging system of claim 15 having coupling means for coupling at least two pieces of said edging strip, said coupling means having first and second sides of the same configurations as said two pieces of said edging strips so as to interfit with said first and second sides of said pieces of said edging strips, respectively.

20. The edging system of claim 19 wherein said coupling means includes a coupling device having two portions formed at an angle to each other whereby two pieces of said edging strip can be coupled to form an angle between them.

21. The edging system of claim 19 wherein said coupling means includes a coupling device having an arc of small radius in plan view whereby at least two pieces of said edging strip can be coupled.

22. The edging strip of claim 13 in which the strip has longitudinal ridges and grooves to provide strength to the strip and to assist in retaining the strip in the ground.

* * * * *

UNITED STATES PATENT AND TRADEMARK OFFICE
CERTIFICATE OF CORRECTION

PATENT NO. : 5,020,272

DATED : June 4, 1991

INVENTOR(S) : Robert T. Herrema et al.

It is certified that error appears in the above-identified patent and that said Letters Patent is hereby corrected as shown below:

Col. 2, line 43;
    After "that" insert --portion--;
Col. 6, claim 13, line 12;
    After "extending" insert --along--.

Signed and Sealed this

Twenty-sixth Day of January, 1993

*Attest:*

STEPHEN G. KUNIN

*Attesting Officer*      *Acting Commissioner of Patents and Trademarks*